United States Patent [19]

Le Fol

[11] Patent Number: 4,856,750
[45] Date of Patent: Aug. 15, 1989

[54] HYDROELASTIC SUPPORT, IN PARTICULAR FOR THE SUSPENSION OF A VEHICLE ENGINE

[75] Inventor: Marcel Le Fol, Chateaugiron, France

[73] Assignees: Automobiles Peugeot, Paris; Automobiles Citroen, Neuilly/Seine, both of France

[21] Appl. No.: 181,112

[22] Filed: Apr. 13, 1988

[30] Foreign Application Priority Data

Apr. 13, 1987 [FR] France .................. 87 05226

[51] Int. Cl.$^4$ ............................................. F16M 13/00
[52] U.S. Cl. .................................. 248/562; 248/636; 248/638; 267/140.1
[58] Field of Search ............... 248/636, 638, 659, 562; 267/140.1, 219; 123/192 R; 180/300

[56] References Cited

U.S. PATENT DOCUMENTS

| | | |
|---|---|---|
| 2,226,388 | 12/1940 | Richter . |
| 2,387,066 | 10/1945 | Harding . |
| 2,540,130 | 2/1951 | Lee . |
| 2,562,195 | 7/1951 | Lee . |
| 2,926,881 | 3/1960 | Painter . |
| 3,013,920 | 12/1961 | Harris et al. . |
| 3,154,273 | 10/1964 | Paulsen . |
| 3,202,388 | 8/1965 | Goodwin . |
| 3,586,403 | 6/1971 | Cooley . |
| 3,642,268 | 2/1972 | Hipsher . |
| 3,651,902 | 3/1972 | Peddinghaus . |
| 3,731,771 | 5/1973 | Borgo . |
| 3,795,390 | 3/1974 | Kendall et al. . |
| 3,958,654 | 5/1976 | Le Salver et al. . |
| 3,970,162 | 7/1976 | Le Salver et al. . |
| 4,054,277 | 10/1977 | Sirven . |
| 4,159,091 | 6/1979 | Le Salver et al. . |
| 4,191,398 | 3/1980 | Willetts . |
| 4,211,429 | 7/1980 | Howard . |
| 4,215,842 | 8/1980 | Brenner et al. . |

(List continued on next page.)

FOREIGN PATENT DOCUMENTS

| | | |
|---|---|---|
| 0005730 | 4/1979 | European Pat. Off. . |
| 0014742 | 9/1980 | European Pat. Off. . |
| 0027751 | 4/1981 | European Pat. Off. . |
| 0036470 | 9/1981 | European Pat. Off. . |
| 0044908 | 2/1982 | European Pat. Off. . |
| 0072262 | 2/1983 | European Pat. Off. . |
| 91246 | 10/1983 | European Pat. Off. ......... 267/140.1 |
| 0139261 | 5/1985 | European Pat. Off. . |
| 0147242 | 7/1985 | European Pat. Off. . |
| 0148387 | 7/1985 | European Pat. Off. . |

(List continued on next page.)

OTHER PUBLICATIONS

Report "Theory of the Hydraulically Damped Motor Mount With a Long Nozzle".

(List continued on next page.)

*Primary Examiner*—J. Franklin Foss
*Attorney, Agent, or Firm*—Burns, Doane, Swecker & Mathis

[57] ABSTRACT

Fixing means (4, 5) extend axially throughout this support which has a generally annular shape. It comprises an annular elastically yieldable body (1) connected to two frames (2, 3), a flexible elastically yieldable wall (8) fixed between the two frames (2, 3) and defining with the outer surface of the body (1) a working chamber (A). This chamber communicates with an expansion chamber (B) through a duct (16). The support also includes means for limiting its axial and radial movements. Such a support has a particularly low specific stiffness both in the axial and transverse direction, which improves the filtering of high frequency vibrations, while affording a good damping of low frequency and large amplitude trepidations. It is moreover easy to manufacture and therefore of relatively low cost.

12 Claims, 3 Drawing Sheets

4,856,750

Page 2

U.S. PATENT DOCUMENTS

| | | |
|---|---|---|
| 4,262,886 | 4/1981 | Le Salver et al. . |
| 4,274,656 | 6/1981 | Lederman . |
| 4,277,056 | 7/1981 | Ticks . |
| 4,319,768 | 3/1982 | Youngdale . |
| 4,336,968 | 6/1982 | Hibner . |
| 4,389,045 | 6/1983 | Taylor . |
| 4,422,779 | 12/1983 | Hamaekers et al. . |
| 4,469,316 | 9/1984 | van den Boom et al. . |
| 4,510,818 | 4/1985 | Inui . |
| 4,519,211 | 5/1985 | Sedille et al. . |
| 4,568,069 | 2/1986 | Poupard . |
| 4,573,656 | 3/1986 | Yoshida ................ 267/140.1 X |
| 4,588,173 | 5/1986 | Gold et al. . |
| 4,603,844 | 8/1986 | Chen . |
| 4,630,803 | 12/1986 | Werner et al. . |
| 4,657,232 | 4/1987 | West . |
| 4,673,156 | 6/1987 | Tabata ..................... 248/562 X |
| 4,679,777 | 7/1987 | Gold et al. . |
| 4,679,778 | 7/1987 | Tabata ..................... 248/562 X |
| 4,688,662 | 8/1987 | Correll . |
| 4,702,346 | 10/1987 | Uno et al. . |
| 4,705,410 | 11/1987 | von Broock . |
| 4,720,086 | 1/1988 | Le Salver et al. . |
| 4,733,854 | 3/1988 | Miyamoto . |
| 4,738,434 | 4/1988 | Marjoram . |
| 4,767,106 | 8/1988 | Le Fol . |
| 4,767,107 | 8/1988 | Le Fol ........................ 267/140.1 |
| 4,768,760 | 9/1988 | Le Fol . |

FOREIGN PATENT DOCUMENTS

| | | |
|---|---|---|
| 0149080 | 7/1985 | European Pat. Off. . |
| 0154268 | 9/1985 | European Pat. Off. . |
| 0163817 | 12/1985 | European Pat. Off. . |
| 209883 | 1/1987 | European Pat. Off. ......... 267/140.1 |
| 0231898 | 1/1987 | European Pat. Off. . |
| 0213324 | 3/1987 | European Pat. Off. . |
| 0242254 | 12/1987 | European Pat. Off. . |
| 547194 | 2/1934 | Fed. Rep. of Germany . |
| 728501 | 11/1942 | Fed. Rep. of Germany . |
| 1124832 | 3/1962 | Fed. Rep. of Germany . |
| 1625389 | 7/1970 | Fed. Rep. of Germany . |
| 7407909 | 5/1977 | Fed. Rep. of Germany . |
| 2948408 | 6/1981 | Fed. Rep. of Germany . |
| 3414547 | 4/1984 | Fed. Rep. of Germany . |
| 3245653 | 6/1984 | Fed. Rep. of Germany . |
| 3610611 | 10/1987 | Fed. Rep. of Germany . |
| 1189778 | 3/1959 | France . |
| 1242350 | 8/1960 | France . |
| 1336186 | 7/1963 | France . |
| 2332151 | 6/1977 | France . |
| 2435632 | 4/1980 | France . |
| 2547378 | 6/1984 | France . |
| 2555272 | 5/1985 | France . |
| 59-37348 | 6/1984 | Japan . |
| 59-231233 | 12/1984 | Japan . |
| 60-113836 | 6/1985 | Japan . |
| 60-132144 | 7/1985 | Japan . |
| 60-155029 | 8/1985 | Japan . |
| 60-166509 | 8/1985 | Japan . |
| 60-179543 | 9/1985 | Japan . |
| 60-157538 | 12/1985 | Japan . |
| 60-176802 | 1/1986 | Japan . |
| 61-62631 | 3/1986 | Japan . |
| 61-62632 | 3/1986 | Japan . |
| 61-165040 | 7/1986 | Japan . |
| 61-180036 | 8/1986 | Japan . |
| 61-197834 | 9/1986 | Japan . |
| 62-118132 | 5/1987 | Japan . |
| 62-194047 | 8/1987 | Japan . |

OTHER PUBLICATIONS

Report comparing Motor Mounts (with English translation).
Drawing dated Oct. 5, 1979 with attachments.
Freudenberg drawing 10780 dated Nov. 5, 1979.
"The Use of Engine Mounts With Integrated Hydraulic Damping in Passenger Cars", presented by Le Salver, 1983.
Patents Abstracts of Japan, vol. 10, No. 18, dated Jan. 24, 1986.

FIG. 5
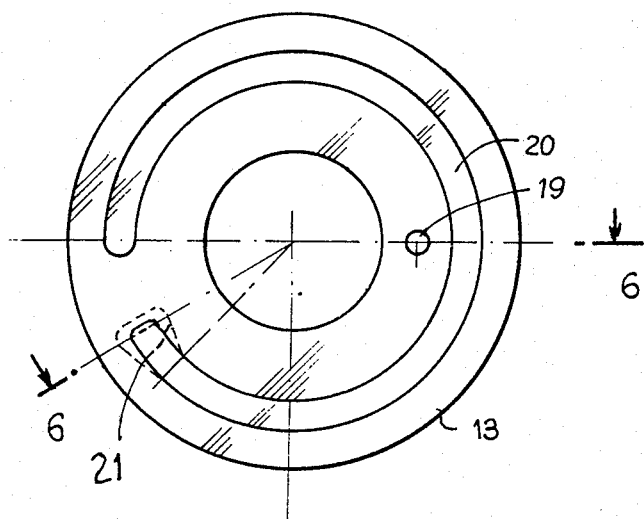
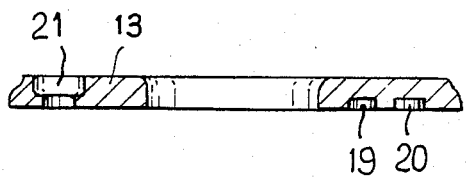
FIG. 6

HYDROELASTIC SUPPORT, IN PARTICULAR FOR THE SUSPENSION OF A VEHICLE ENGINE

The present invention relates to elastically yieldable supports for interposition between a vibrating mechanical unit, for example a power unit of a vehicle, and another unit, for example a structure of said vehicle.

More specifically, the invention applies to any elastically support of the type comprising a body of an elastomer material of annular shape disposed between two frames, one of which is adapted to be connected to one of the two units, whereas the other is adapted to be connected to the other unit, through a fixing member which extends throughout the support on the axis of the support, the support further comprising an annular working chamber filled with fluid and is partly defined by the body of elastomer material and an expansion chamber also filled with fluid and separated from the working chamber by a rigid partition wall defining at least one passage of communication between the two chambers.

It is known that these supports having a fixing member extending throughout the supports possess, by design, a particular stiffness which is greater than comparable supports which do not have a fixing member extending therethrough.

An object of the invention is to provide such a support which has, both in the axial direction and in the transverse direction, a particular stiffness which is not greater than that of a support which does not have a fixing member extending therethrough so as to improve the filtering of the high frequency vibrations while retaining a good damping of trepidations at low frequency and large amplitudes.

It will be recalled in this respect that the particular stiffness of a hydroelastic support may be defined as being the stiffness measured at a constant interior pressure.

Another object of the invention is to arrange that the support be particularly easy to manufacture.

The invention therefore provides an elastically yieldable support of the type defined hereinbefore, wherein the annular working chamber is partly defined by a flexible elastically yieldable wall in the form of a bellows.

According to other features:

the annular chamber is radially inwardly defined by a thick wall of the body of elastomer material and outwardly by said elastically yieldable flexible wall in the form of a bellows;

said flexible elastically yieldable wall has a V-shaped cross-section whose projecting portion extends toward the axis of the support;

a reinforcing ring is provided within the re-entrant portion of said V-shaped section and which surrounds the flexible elastically yieldable wall;

said flexible elastically yieldable wall is in one piece with the body and connected to the thick central wall by a membrane fixed to an adjacent frame;

one of the frames includes an inner member fixed to the body of elastomer material and an outer member fixed to the flexible elastically yieldable wall, said two members being connected to the rigid partition wall between the two chambers;

the body of elastomer material, the flexible elastically yieldable wall, one of the frames and the inner and outer members of the other frame constitute a sub-assembly;

as the expansion chamber is defined between the rigid partition wall and a flexible annular membrane, this partition wall and this membrane are fixed to said sub-assembly by a forming-over of the inner and outer members;

as the flexible membrane is protected by a rigid annular cover, said cover is fixed at the same time as the membrane and the rigid partition wall by a forming-over of the inner and outer members;

the rigid partition wall comprises a washer connecting the inner and outer members and a disc defining with said washer a duct of communication between the working chamber and the expansion chamber.

The invention will be described in more detail hereinafter with reference to the accompanying drawings which are given solely by way of example and in which:

FIG. 5 is a bottom view of another member which is part of the support shown in FIGS. 1 and 2, and FIG. 6 is a sectional view taken on line 6—6 of FIG. 5.

Figure 2:
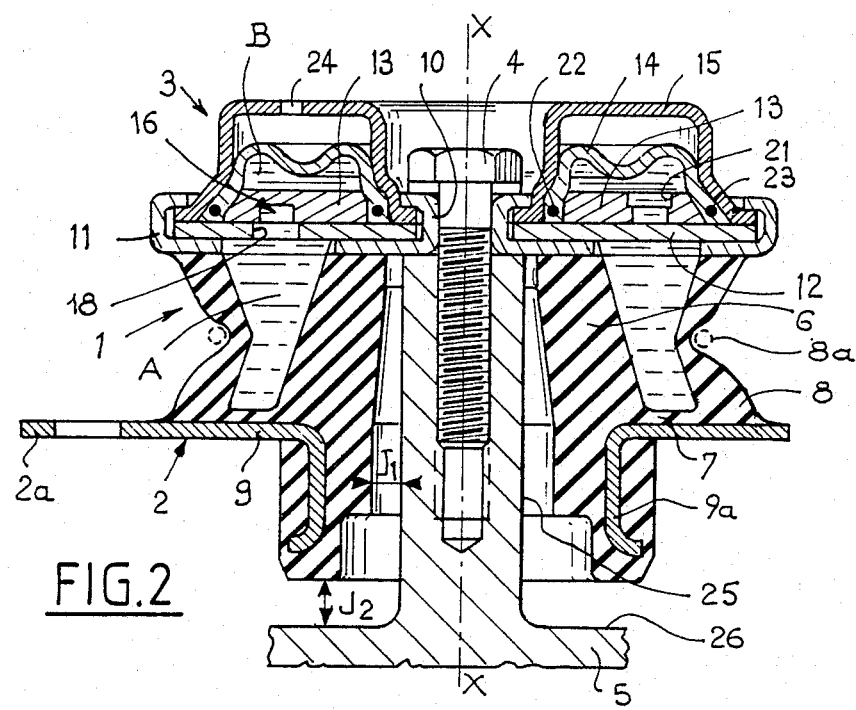
FIG. 2 is a sectional view taken on line 2—2 of FIG. 1.
Figure 1:
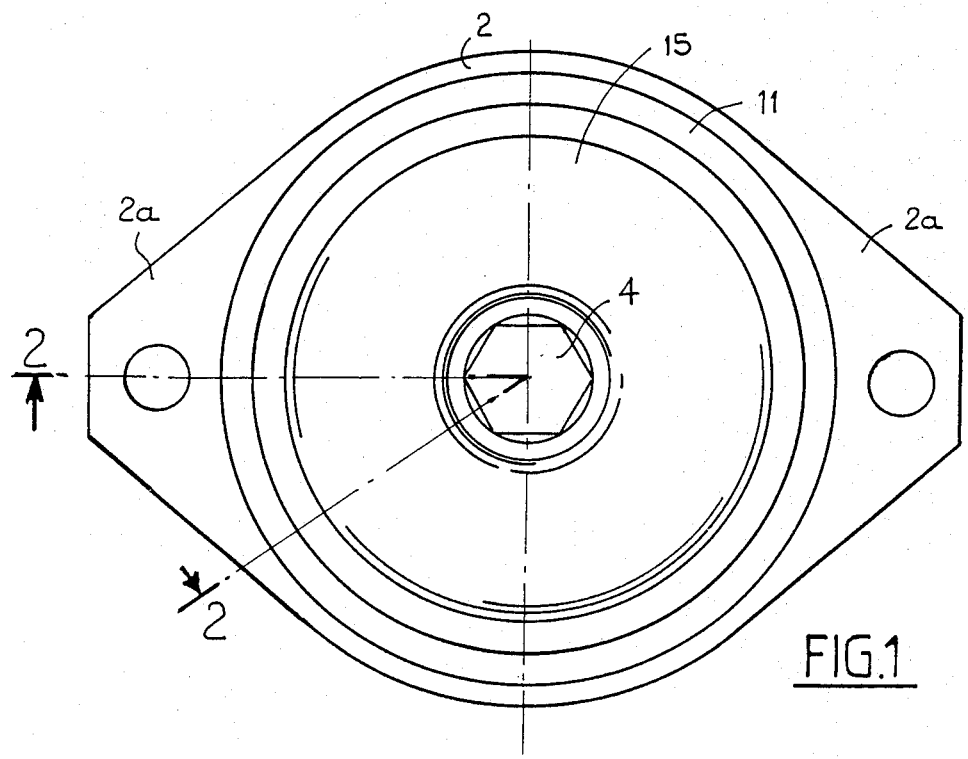
FIG. 1 is a top plan view of a support according to the invention.

There is shown in the drawings a support having an axis X—X and comprising a body 1 made from rubber or another elastomer and having a generally annular shape.

This body is disposed between two metal frames 2 and 3 adapted to be connected respectively to one of two units (not shown) between which the support must be interposed. These two frames extend generally in a direction perpendicular to the axis X—X. In the illustrated embodiment, the frame may, for example, be connected to the structure of a vehicle by means of fixing lugs 2a, while the frame 3 may be connected to an engine by means of a bolt 4 and an intermediate member 5.

For convenience of description, reference will be made hereinafter to the arrangement shown in the drawings for designating the lower or upper parts of the support. However, it will be understood that, in use, this support may be disposed with an orientation different from that shown in the drawings.

The body of elastomer comprises an annular central wall or a spigot having a relatively large radial thickness.

At an intermediate point of its height, the wall 6 is in one piece with a radial wall 7 which connects it to a flexible elastically yieldable annular wall 8 in the shape of a bellows More precisely, in the illustrated embodiment, this wall has a V-shaped cross-section, the projecting portion of which extends toward the support. Preferably, a reinforcing ring 8a is disposed in the bottom or in the re-entrant portion of the V.

The frame 2 is made simply from a press-formed plate 9 defining a cylindrical skirt 9a embedded in the lower portion of the body of elastomer, and fixing lugs 2a.

The lower surfaces of the walls 7 and 8 are vulcanized or bonded to the upper surface of the plate 9.

At the upper end of the body, end surfaces of the central wall and the outer wall are respectively vulcanized or bonded to an inner metal member 10 and an outer metal member 11. These two members of annular shape are disposed in the same plane and are part of the upper frame 3. They are formed-over or set along the inner edge in respect of the member 10 and along the outer edge in respect of the member 11 onto an assembly comprising a metal washer 12, a disc 13, a flexible annular membrane 14 and a cover 15.

The annular volume defined between the walls 6 and 8 of the body of elastomer and the lower surface of the washer 12 constitutes a working chamber A, while the volume defined between the upper surface of the disc 13 and the flexible membrane constitutes an expansion chamber B.

Figures 3, 4:
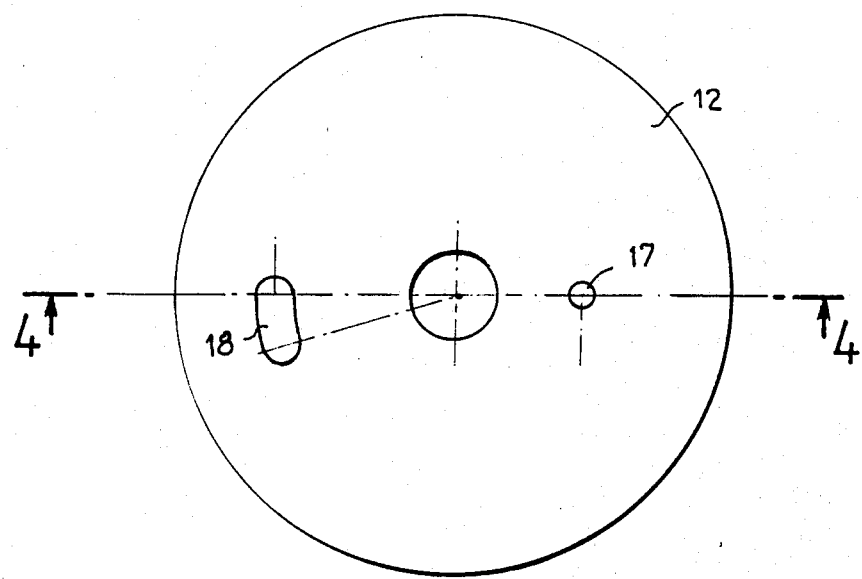
FIG. 3 is a top plan view of a washer which is part of the support shown in FIGS. 1 and 2.
FIG. 4 is a sectional view taken on line 4—4 of FIG. 3.

The washer 12, shown in more detail in FIGS. 3 and 4, provides the connection between the two members 10 and 11. Furthermore, it defines with the adjacent disc 13, a duct 16 of communication between the working chamber and the expansion chamber. This washer includes a stud 17 for centering it relative to the disc 13 and an oblong opening 18.

The disc 13 made from a plastics material, aluminium or other material, is shown in more detail in FIGS. 5 and 6. This disc includes a centering cavity 19 adapted to cooperate with the stud 17 of the washer. On the side thereof facing the washer, this disc has a groove 20 one end of which is located in front of the orifice 18 of the washer, while at its other end this groove opens onto the expansion chamber through an orifice 21. The length and the section of the duct 16 thus defined determines the maximum value of the frequency of resonance of the column of liquid contained in this duct and the choice of these parameters therefore enables the desired damping frequency to be obtained.

The membrane 14 made from rubber is preferably moulded onto two rings 22 and 23 of plastics material for facilitating the automatic assembly and improving the seal of the forming-over or setting.

In the known manner, the cover includes an aperture 24 in order to avoid hindering the deformations of the membrane 14.

Such a support or block operates in a relatively conventional manner and therefore need not be described in detail. On the other hand, the design and the construction of the support are novel and should be explained.

First of all, the shape of a bellows given to the outer wall defining the working chamber is particularly advantageous since it is very highly effective under the conditions of operation of such a support which may be assimilated to those of a pump. The resistance to pressure is ensured by the arch effect due to the fold shape of the bellows. This effect is still further improved by the presence of a reinforcing ring 8a. This arrangement therefore results in high resistance to the pressure. On the other hand, it affords high flexibility as concerns axial and radial displacements, owing to the articulation which is produced in the region of the fold of the bellows. For this purpose, the thickness of the wall may be minimum in this region.

The manufacture and the assembly of this support are also very simple and advantageous.

First of all, a sub-assembly is constructed comprising the body of elastomer, the frame 2 and the inner member 10 and outer member 11. The other elements constituting the support are then assembled during the forming-over or setting operation on the respectively inner and outer edge portions of the members 10 and 11, this forming-over being effected, in the known manner, after the working chamber and expansion chamber have been filled with a hydraulic liquid constituted by a mixture of water and glycol, this forming-over operation being carried out in an environment of water and glycol, so as to ensure the correct filling of the two chambers.

As a result of these relatively simple assembly operations, the support thus formed is of low price for a product integrating all the functions of limitation of movement and damping. As concerns the limitation of the movements, it will merely be mentioned that the radial movements are determined by the value of the radial clearance J1 provided between the inner wall of the body of elastomer and the adjacent surface 25 of the member 5.

The axial movement is limited by the taking up of the clearance J2 between the lower end of the body of elastomer and the adjacent portion 26 of the member 5.

The axial movement in the opposite direction is limited merely by the compression of the elastically yieldable body between the two frames.

As a modification, it may be mentioned that the flexible elastically yieldable wall defining the working chamber may have the shape of a bellows having a plurality of folds. It will be understood that other modifications may be envisaged as concerns the shape or the construction of some of the other components parts of the support without departing from the scope of the invention defined in the claims.

I claim:

1. A hydroelastic support having a longitudinal axis and for interposition between two units, such as for example a power unit and the structure of a vehicle, said support comprising a first frame for connection to one of said units, a second frame, a fixing member extending axially throughout said support for fixing the second frame to the other of said units, a body of an elastomer material of annular shape disposed between said two frames, an annular working chamber partly defined by said body of elastomer material, a fluid filling said working chamber, an expansion chamber, a fluid filling said expansion chamber, a rigid partition wall separating the expansion chamber from the working chamber and defining at least one passage of communication between said two chambers, and a flexible elastically yieldable wall in the shape of a bellows connected in a sealed manner to each of said two frames and partly defining said annular working chamber.

2. A support according to claim 1, wherein a thick wall of the body of elastomer material radially inwardly defines the annular working chamber and said flexible elastically yieldable wall in the shape of a bellows radially outwardly defines said annular working chamber.

3. A support according to claim 1, wherein said flexible elastically yieldable wall has a V-shaped cross-section having a projecting portion extending radially toward said axis of the support.

4. A support according to claim 3, comprising a reinforcing ring disposed within a re-entrant portion of said V-shaped cross-section and surrounding the flexible elastically yieldable wall.

5. A support according to claim 2, wherein said flexible elastically yieldable wall is in one piece with said body and a membrane fixed to an adjacent of one of said frames, connects said thick central wall to said flexible elastically yieldable wall.

6. A support according to claim 1, wherein one of said frames includes an inner member fixed to the body of elastomer material and an outer member fixed to the flexible elastically yieldable wall, said two members being connected to the rigid partition wall between said two chambers.

7. A support according to claim 6, wherein the body of elastomer material, the flexible elastically yieldable wall, one of said frames, and said inner member and outer member of said other frame constitute a sub-assembly.

8. A support according to claim 7, wherein a flexible annular membrane and said partition wall define the expansion chamber and formed-over portions of said inner member and said outer member fix said partition wall and said membrane to said sub-assembly.

9. A support according to claim 8, wherein a rigid annular cover protects the flexible annular membrane and said cover is fixed at the same time as said membrane and the rigid partition wall by the forming-over of said inner member and said outer member.

10. A support according to claim 6, wherein the rigid partition wall comprises a washer connecting said inner member to said outer member and a disc defining with said washer a duct of communication between said working chamber and said expansion chamber.

11. A support according to claim 1, wherein the flexible elastically yieldable wall has a minimum thickness in the region of a fold of the bellows.

12. A hydroelastic support having a longitudinal axis and for interposition between two units, such as for example a power unit and the structure of a vehicle, said support comprising a first frame for connection to one of said units, a second frame, a fixing member extending axially throughout said support for fixing the second frame to the other of said units, a body of an elastomer material of annular shape disposed between said two frames, an annular working chamber partly defined by said body of elastomer material, a fluid filling said working chamber, an expansion chamber, a fluid filling said expansion chamber, a rigid partition wall separating the expansion chamber from the working chamber and defining at least one passage of communication between said two chambers and a flexible elastically yieldable wall in the shape of a bellows connected in a sealed manner to each of said two frames and partly defining said annular working chamber;

wherein the annular working chamber is defined radially inwardly by a thick wall of the body of elastomer material and is defined radially outwardly by said flexible elastically yieldable wall in the shape of a bellows; and wherein said flexible elastically yieldable wall has a V-shaped cross-section with a projecting portion extending radially toward said longitudinal axis of the support.

* * * * *